Feb. 25, 1947.  W. B. MACAULAY  2,416,450
MULTIPLE CELL DIAPHRAGM JIG WITH COMMON ACTUATING MEANS
Filed Sept. 18, 1944   4 Sheets-Sheet 1

INVENTOR.
WALTER B. MACAULAY
BY
ATTORNEY.

Feb. 25, 1947.                W. B. MACAULAY                2,416,450
            MULTIPLE CELL DIAPHRAGM JIG WITH COMMON ACTUATING MEANS
                        Filed Sept. 18, 1944      4 Sheets-Sheet 2

INVENTOR.
WALTER B. MACAULAY
BY
ATTORNEY.

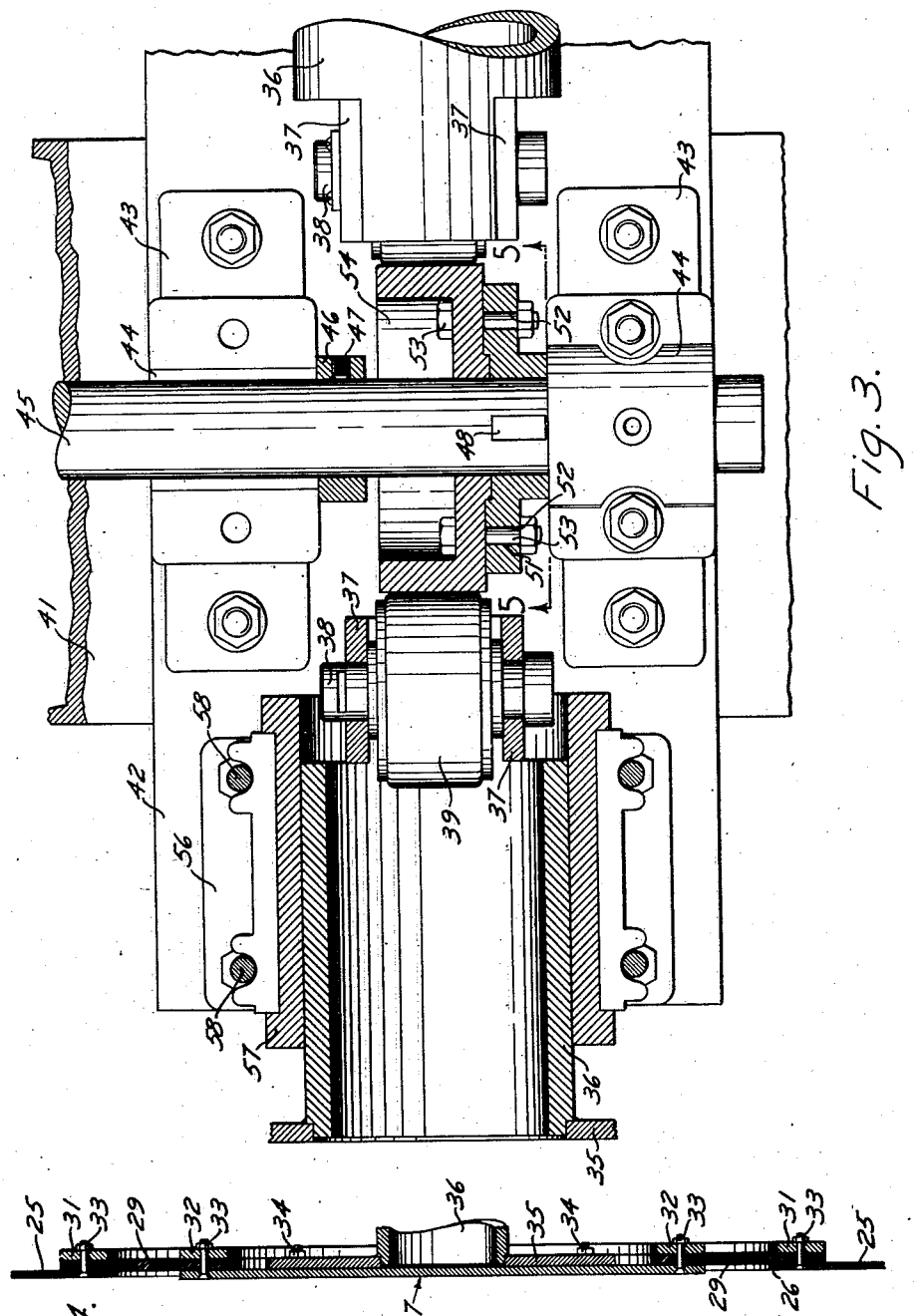

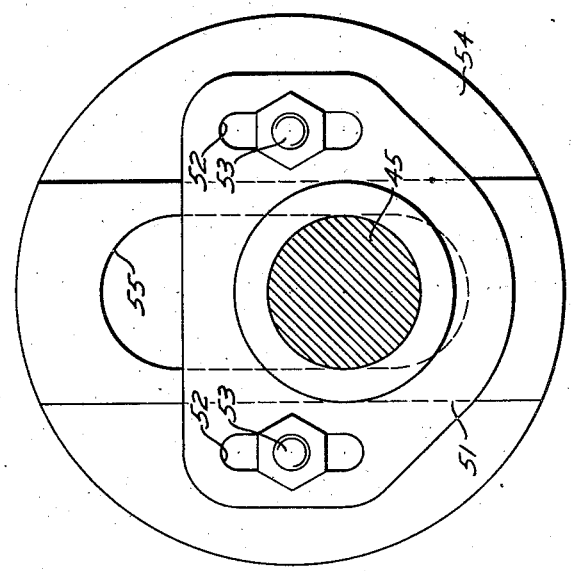
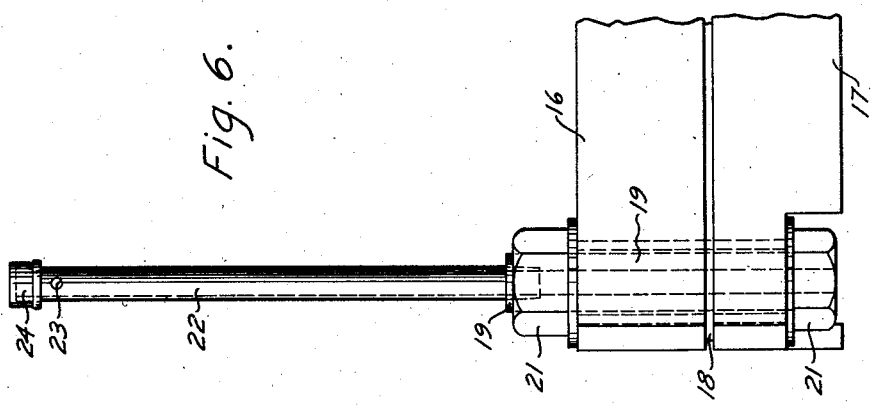

Patented Feb. 25, 1947

2,416,450

UNITED STATES PATENT OFFICE 2,416,450

MULTIPLE CELL DIAPHRAGM JIG WITH COMMON ACTUATING MEANS

Walter B. Macaulay, Oakland, Calif., assignor to Yuba Manufacturing Company, San Francisco, Calif., a corporation of California Application September 18, 1944, Serial No. 554,695

5 Claims. (Cl. 209—455)

This invention relates to ore jigs of the stationary bed type, particularly suitable in connection with dredging operations for the recovery of values such as gold, platinum and tin.

Generally, jigs of this type include a hutch water tank, a screen supported on the upper end of the tank, and some means for imparting pulsations to the hutch water and to the bed of slurry or diluted dredge material delivered to and supported by the screen.

One of the objects of my invention is the provision in a stationary bed jig of a simple mechanism for imparting pulsations of predetermined amplitude to the hutch water.

Still another object of the invention is the provision of a two cell jig wherein the drive for transmitting pulsations to the hutch water is fairly uniformly loaded.

A still further object of the invention is the provision of a reciprocating drive imposing only rectilinear forces on the pulsating diaphragms.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 3 is an enlarged top plane detail of the drive mechanism with portions thereof in section.

Figure 4 is a vertical section of the pulsating member associated with one wall of the hutch tank.

Figure 5 is a vertical section of the adjustable eccentric roller taken on the line 5—5 of Figure 3.

Figure 6 is an enlarged elevation of the vent tube associated with the grids and screen of the jig.

Figure 1:
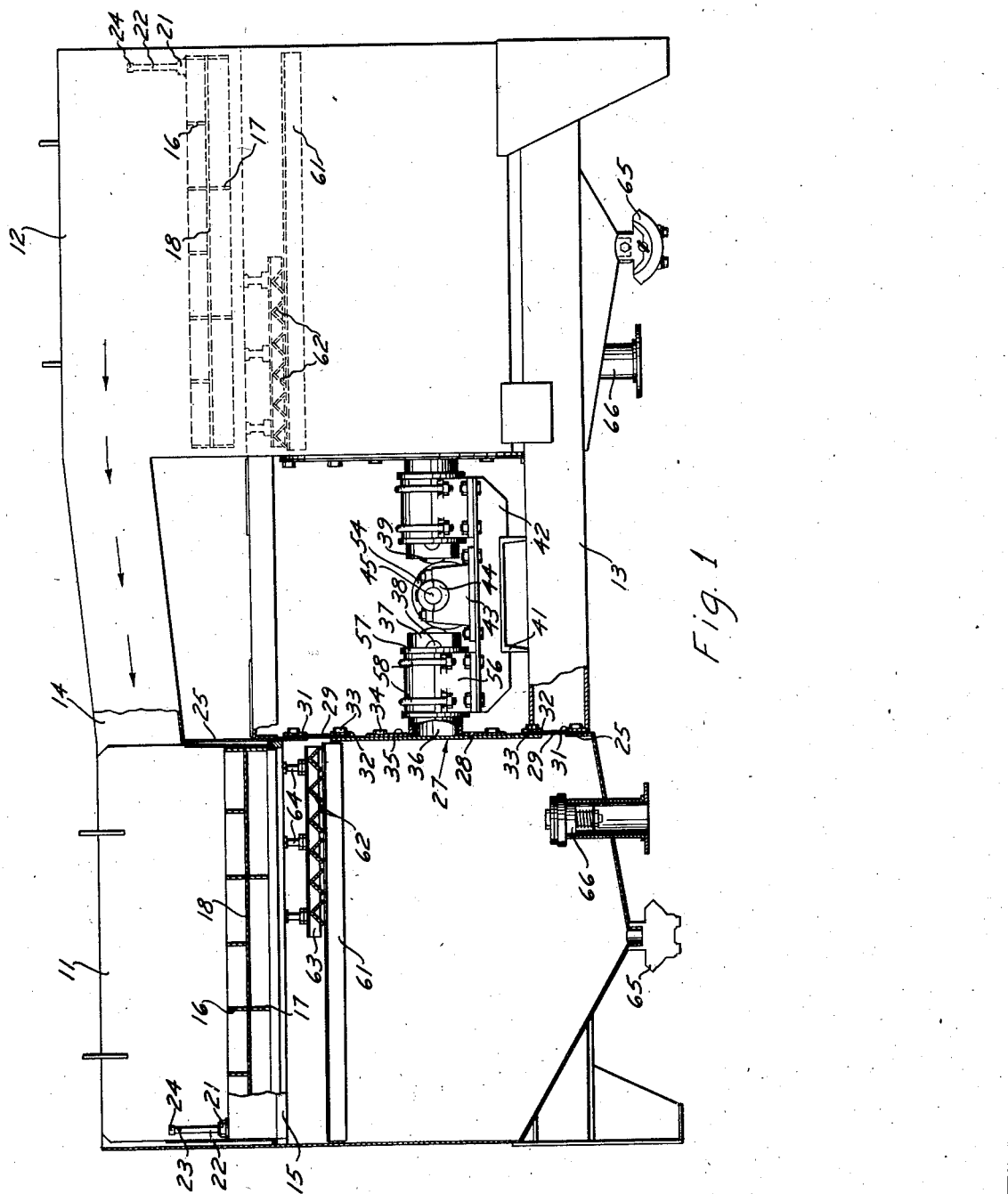
Figure 1 is a front elevation of a two cell stationary bed jig embodying the objects of my invention with the left cell shown in section better to illustrate its construction and operation.
Figure 2:
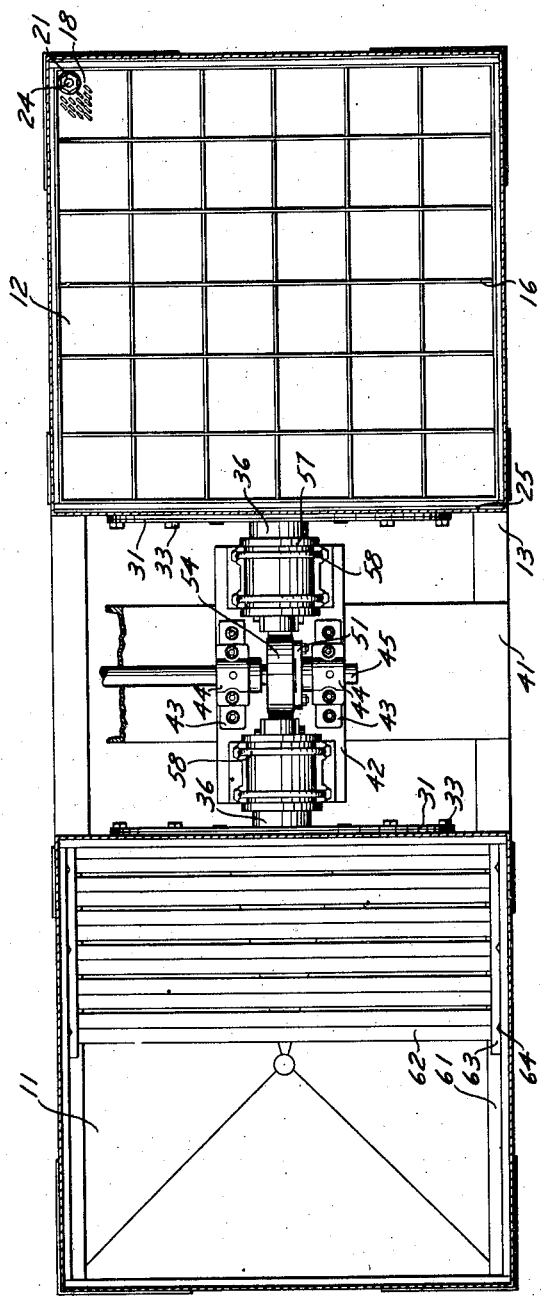
Figure 2 is a top plane view of the two cell jig illustrated in Figure 1, but in which the grids and screen of the left cell and the overflow from the right cell to the left cell have been removed in order to show the balanced drive mechanism.

Briefly, the jig illustrated in these figures comprises a pair of opposed cells, each provided at its upper end with conventional grids and screens to which diluted dredge material or other slurry is delivered in the usual manner. Also, as is the general practice, one of the cells is at a higher level than the other, so that the overflow from the former can pass to the latter. Inserted in the opposed vertical walls of each cell is a diaphragm and located between the cells is a power driven adjustable eccentric roller associated with means for alternately reciprocating the diaphragm of each cell. Disposed within and across a portion of each cell are a plurality of spaced parallel pressure equalizing baffle members, and associated with each cell screen is a vent tube for establishing communication between a point immediately below the screen and atmosphere. Located at the bottom of each cell is a hutch water inlet valve and a hutch product discharge valve.

More particularly, and as shown in the drawings, my invention has been embodied in a jig comprising a pair of opposed and laterally spaced similar tanks or cells 11 and 12 supported on a common frame 13 with the cell 12 located at a slightly higher elevation than the cell 11. Bridging the upper opposed sides of these cells is an inclined tray 14 for permitting the overflow of diluted dredge material or other slurry from the cell 12 to the cell 11 in accordance with standard practice when multiple cell jigs are used.

Fastened to the inner walls of each cell at the upper end thereof is a ledge 15, for supporting a pair of readily removable superposed grids 16 and 17, and clamped between these grids is a screen 18. The mesh of the screen depends upon the material being concentrated.

Extending through one corner of the grids 16 and 17 and their intervening screen 18 is a sleeve 19 secured to the grids by nuts 21, and fastened to the upper end of the sleeve 19 is an upwardly extending vent tube 22 formed at its upper end with a vent opening 23, and provided with a cap 24 (see Figure 6). The sleeve 19 and tube 22, therefore, serve to establish communication between a point below the screen 18 and atmosphere. This expedient has been found helpful for the reason that when the jig is shut down, the screen occasionally becomes blinded or plugged by the slurry remaining on its surface, and in the absence of such a vent, difficulty is experienced in subsequently starting the jig, as will be more fully explained when the operation of the jig is described.

Formed in the opposed walls 25 of each of the cells 11 and 12 is a circular opening 26, and sealed over this opening is a composite diaphragm 27 (see Figure 4) including a plate or disc 28 having a smaller diameter than the opening 26. The diaphragms of the adjacent cells are parallel. Bridging the disc 28 and the surrounding portions of the wall 25 is a flexible rubber ring 29 sealed thereto by means of an outer ring 31 and an inner ring 32, these rings being fastened to the wall 25 by bolts 33. Fastened to the disc 28 by bolts 34 is a ring 35 to which is welded or otherwise secured a cylindrical roller supporting member 36. The free end of the member 36 is provided with spaced vertical bearing plates 37 on which is mounted a trunnion 38. Journaled on the trunnion 38 is a roller 39, the function of which will be presently described. The cylindrical member 36 and the roller 39 together constitute a follower perpendicular to its diaphragm and the followers are coaxial or are in alinement.

Included as part of the frame 13 is a transverse channel 41 extending between the two cells 11 and 12, and mounted on this channel is a pedestal or base member 42. Bolted to the base member 42 are a pair of spaced axially aligned pillow blocks 43, and journaled in bearings 44 associated with each pillow block is a drive shaft 45 held against longitudinal displacement by a collar 46 provided with a set screw 47. Fastened to the shaft 45 by a key 48 is an eccentric roller supporting member 51 formed with a pair of spaced parallel slots 52. Adjustably secured to the supporting member 51 by bolts 53 passing through the slots 52, is an eccentric roller 54 formed with a slot 55 through which the shaft 45 extends. As a result of this construction, the eccentric roller 54 can be locked in any desired position with respect to the shaft 45, and serves as a convenient means for controlling the eccentricity between the shaft and the eccentric roller. From Figure 3, it will be noted that the eccentric roller 54 is engaged by the rollers 39 of the followers, and that consequently the eccentricity of the roller 54 with respect to the shaft 45 will determine the amplitude of movement imparted by the roller 54, through the rollers 39 and the members 36, to the diaphragms 27. Bolted to the base member 42 at either side of the shaft 45 is a saddle 56, and seated in this saddle is a bearing sleeve 57 or guide within which the associated one of the cylindrical, roller supporting members 36 of the followers, is freely slidable. The bearing sleeve 57 is detachably locked in its seating engagement with the saddle 56 by U-bolts 58. By loosening the U-bolts, the bearing sleeve 57 can be rotated through ninety degrees when there has been any appreciable wear on its lower and upper surface due to the sliding action of the member 36. In this connection, it is to be observed that the wear on the bearing sleeve is largely on its lower and upper surface, there being substantially no wear on its lateral surface.

Welded to the opposed inner surfaces of each jig cell is a shelf angle 61 (Figure 1) and resting on the angles 61 are the ends of a plurality of spaced, parallel downwardly facing baffle angles 62. Supported on the ends of the angles 62 above each of the angles 61 is an angle 63 and disposed between these latter angles and ledges 15 are a number of small screw jacks 64. By means of this construction the baffle angles 62 can be adjustably clamped between the angles 61 and 63 in any desired spaced relation across each of the cells 11 and 12 beneath the jig screens 18 for the purpose of substantially equalizing the hydraulic pressure transmitted to the under side of each screen throughout its entire area. Since the baffle angles 62 are spaced and face downwardly they do not materially obstruct the downward movement of the hutch product through the cell.

The inclined bottom of each cell is provided with a hutch product discharge valve 65, and with a hutch water inlet check valve 66, both of these valves being of standard construction.

In the operation of the two-celled jig as above described, diluted dredge material or other slurry is delivered to the cell 12, a portion of this slurry overflowing the tray 14 on to the screen 18 of cell. The rotation of the shaft 45 (which may be driven by any suitable motor not shown) produces an eccentric movement of the roller 54. This movement of the roller 54 is imparted to the diaphragms 27 of each cell through the rollers 39 and through the supporting members 36 of the followers. The pulsating movement of the diaphragms 27 is in turn imparted to the hutch water contained in each of the cells. Since the water is incompressible, the periodic pressure to which the hutch water is subjected is transmitted through the body of hutch water and between the baffle angles 62 to the screen 18. In this connection, it is to be noted that the periodic outward movement of each of the diaphragms 27 is effected by the weight of the column of hutch water in each cell. The roller 39 of the follower associated with each cell is thus always maintained in contact with the eccentric roller 54. The pulsations to which the screens 18 are subjected causes the heavier particles of the slurry contained therein to pass through the screen and downwardly through the hutch water to the inclined bottom of each cell. At this point, the hutch product can be drawn off through the valve 65 as desired. The check valve 66 operates in the usual manner to permit the introduction of water into the cell. When the jig is shut down, the screen 18 may on occasions be blinded or plugged by the remaining slurry. Under these conditions, the diaphragm 27 would move outwardly only by the creation of a partial vacuum beneath the screen. To obviate this difficulty, the vent tube 22 is provided as previously explained to avoid the creation of any such vacuum and to permit the roller 39 always to remain in contact with the eccentric roller 54.

It is to be particularly noted that no part of the weight of the reciprocating mechanism has to be lifted during any part of the cycle of operation of the device, and that consequently the drive shaft 45 and its associated parts are subjected to a far lighter load than would otherwise be the case. Furthermore, since a single eccentric roller 54 actuates the opposed, aligned followers of the two cells, they are pulsed alternately so that the driving load is distributed and the return force of one assists in driving the other. Since the followers move solely in a rectilinear or translatory path despite the eccentric rotation of the roller 54, they impart only a straight line motion to the diaphragms thus prolonging their life by relieving them of any lateral stresses.

I claim:

1. An ore jig comprising: a frame; a pair of spaced cells mounted on said frame, each of said cells including a vertical wall having an opening therein; a diaphragm sealed to each of said walls over said opening; a power driven eccentric roller mounted on said frame between and in alignment with said diaphragms; a pair of saddles mounted on said frame, one between each of said diaphragms and said eccentric roller; a sleeve bearing adjustably mounted on each of said saddles and a follower slidably seated in each of said bearings, one end of each follower being secured to one of said diaphragms and its other end being operatively associated with said eccentric roller.

2. An ore jig comprising: a pair of tanks including facing walls each having an opening therein; a pair of diaphragms each being sealed to a respective one of said facing walls over the opening therein; a follower for each of said diaphragms, said followers being in substantial alignment; means for constraining said followers to rectilinear motion; and means directly engaging and successively actuating said followers for correspondingly reciprocating said diaphragms.

3. An ore jig comprising: a pair of spaced cells each including a facing wall having an opening therein; a pair of diaphragms each being sealed to a respective one of said walls over its opening; a power rotated eccentric roller disposed between said cells; a pair of cylindrical guides in alignment between said cells; and a pair of substantially aligned followers reciprocable in said guides and each directly engaging said roller and one of said diaphragms for translating the rotation of said roller into alternate, rectilinear flexure of said diaphragms.

4. An ore jig comprising: a pair of spaced cells each including a facing wall formed with an opening therein; a pair of diaphragms each sealed to one of said walls over the opening therein; a power rotated eccentric roller disposed between said cells; a pair of substantially aligned cylindrical guides perpendicularly to said diaphragms; and a pair of substantially aligned cylindrical followers reciprocable in said guides and each being connected to one of said diaphragms and being in operative engagement with said roller.

5. An ore jig comprising a pair of cell walls each being formed with an opening therein, diaphragms sealed to said walls over the opening therein with said diaphragms parallel to each other, a pair of cylindrical guides perpendicular to said diaphragms, a pair of cylindrical followers each being reciprocable within one of said guides and being connected to a respective one of said diaphragms, and a single roller interposed between and engaging said followers for actuating said followers successively.

WALTER B. MACAULAY.

REFERENCES CITED

The following references are of record in the file of this patent:

UNITED STATES PATENTS

| Number | Name | Date |
| --- | --- | --- |
| 959,473 | Dandridge | May 31, 1910 |
| 38,773 | Trumbull | June 2, 1863 |
| 2,238,338 | Moir | Apr. 15, 1941 |
| 2,198,816 | Heath | Apr. 30, 1940 |
| 2,039,613 | Storsand | May 5, 1936 |
| 1,058,349 | Bookwalter | Apr. 8, 1913 |
| 1,430,216 | Courtoy | Sept. 26, 1922 |
| 864,776 | Foust | Sept. 3, 1907 |
| 2,132,375 | Bird | Oct. 11, 1938 |
| 1,289,931 | Schott | Dec. 31, 1918 |
| 2,122,039 | Logue | June 28, 1938 |